United States Patent [19]

Wesling

[11] Patent Number: 4,611,153
[45] Date of Patent: Sep. 9, 1986

[54] CHOPPER FREQUENCY DETERMINATION APPARATUS

[75] Inventor: Henry J. Wesling, Mt. Oliver, Pa.

[73] Assignee: Westinghouse Electric Corp., Pittsburgh, Pa.

[21] Appl. No.: 528,288

[22] Filed: Aug. 31, 1983

[51] Int. Cl.⁴ .............................................. H02P 5/06
[52] U.S. Cl. ................................ 318/318; 318/345 R; 318/345 E; 318/139; 364/426
[58] Field of Search ............... 318/139, 254, 314, 317, 318/318, 327, 328, 345, 341, 326, 345 R, 343, 345 CA, 345 E, 258, 259, 415, 607, 606; 363/124; 361/23; 364/426

[56] References Cited

U.S. PATENT DOCUMENTS

| | | | |
|---|---|---|---|
| 3,950,682 | 4/1976 | Dohanich, Jr. ................. | 318/345 X |
| 4,080,555 | 3/1978 | Kawada et al. ................ | 318/318 X |
| 4,090,116 | 5/1978 | Lippitt ............................ | 318/327 X |
| 4,258,300 | 3/1981 | Fromont ......................... | 318/318 |
| 4,284,931 | 8/1981 | Ehret .............................. | 318/318 |
| 4,346,434 | 8/1982 | Morinaga ........................ | 318/341 X |
| 4,491,904 | 1/1985 | Horiuchi et al. ............... | 318/345 G X |
| 4,500,820 | 2/1985 | Noto et al. ...................... | 318/345 R X |
| 4,504,881 | 3/1985 | Wada et al. .................... | 361/23 |
| 4,513,381 | 4/1985 | Houser, Jr. et al. ........... | 318/345 C X |

Primary Examiner—William M. Shoop, Jr.
Assistant Examiner—Shik Luen Paul Ip
Attorney, Agent, or Firm—E. F. Possessky

[57] ABSTRACT

A microprocessor controlled propulsion motor control apparatus for a passenger vehicle is provided, including a chopper apparatus having an interrupt clock to determine the frequency cycle of operation of that chopper apparatus. It is required that this frequency stay within a predetermined tolerance and not vary outside that tolerance. The output pulses from the microprocessor clock are counted between successive signals from the chopper interrupt clock in response to each occurrence of a determined operation condition of the passenger vehicle to determine that the chopper interrupt frequency is satisfactory.

8 Claims, 7 Drawing Figures

CHOPPER FREQUENCY DETERMINATION APPARATUS

BACKGROUND OF THE INVENTION

It is known in the prior art to control the operation of a passenger vehicle propulsion motor control circuit with a programmed microprocessor coupled to a motor control chopper apparatus as shown in U.S. Pat. No. 4,282,466, the disclosure of which is incorporated herein by reference. The chopper frequency cycle of operation can be controlled by a crystal controlled interrupt clock as disclosed in U.S. Pat. No. 4,339,697. The frequency of the chopper operation is selected to reduce generated noise disturbance of the vehicle detection and speed control signals received from track signal blocks which are described in an article published in the *Westinghouse Engineer* for September 1972 at pp. 145–151.

It is desired that the chopper frequency cycle be accurately controlled by clock signals in relation to the particular track signal frequencies utilized for the vehicle speed control and detection to prevent interference with the operation of the track signaling apparatus. Even though the chopper frequency interrupt clock is a crystal controlled oscillator with a frequency selected not to generate harmonics which could be set by the track signaling filter circuits, it is desired to detect any frequency shift of the chopper interrupt clock before the resulting frequency change becomes a problem in relation to vehicle speed control and signal block occupancy detection.

SUMMARY OF THE INVENTION

It is desired to determine the frequency of the chopper interrupt clock operative with a chopper apparatus coupled with a motor and stop the operation of the programmed microprocessor controlled chopper apparatus when a predetermined change of this frequency is established. A comparison is made between the frequency of the internal clock generator used to operate the microprocessor and the frequency of the chopper interrupt clock to establish when the latter frequency has changed more than the predetermined amount and this comparison is made in response to a selected operation of the passenger vehicle.

DESCRIPTION OF A PREFERRED EMBODIMENT

Figure 1:
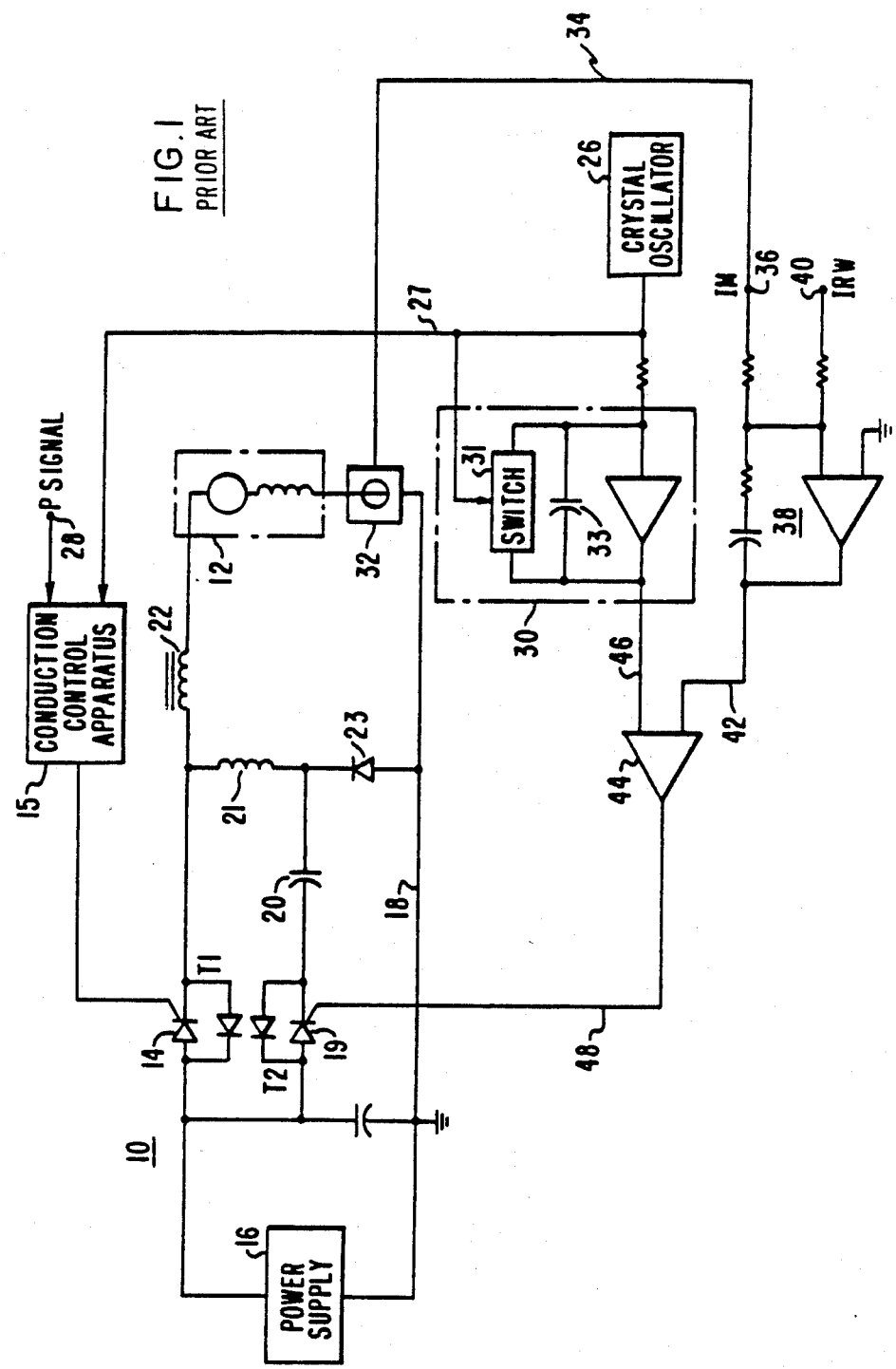
FIG. 1 shows a prior art transit vehicle propulsion motor control apparatus.

In FIG. 1 there is shown a prior art chopper operation control circuit for a transit vehicle propulsion motor apparatus. In the motoring mode the chopper 10 regulates the current in the motor circuit 12. When the main thyristor 14 of the chopper 10 is turned ON by the conduction control apparatus 15 in response to an effort request P signal, this builds up current in the motor circuit 12 by completing the circuit from the positive side of the DC power supply 16 through the motor circuit 12 to ground return 18 and then to the negative side to the power supply 16. When the main thyristor 14 of the chopper is turned OFF by the commutating thyristor 19 operative with the commutating capacitor 20 and the inductor 21. The energy stored in the motor reactor 22 and the inductance of the motor circuit 12 maintains a current flow in the motor circuit 12 through the freewheeling diode 23. The average voltage applied to the motor circuit 12 is controlled by adjusting the ratio of the chopper OFF-time to the chopper ON-time. This adjustment is made by the conduction control apparatus 15 to maintain the desired average motor current and hence the desired motor torque, as described in an article published in the *Westinghouse Engineer* for March 1973 at pp. 34–41.

The crystal oscillator 26 provides a control signal at a predetermined rate such as 218 Hz to the conduction apparatus 15 to fire ON the main thyristor 14 as required in accordance with the effort request P signal supplied on input 28. The crystal oscillator 26 also provides the same control signal at the same predetermined rate to the sawtooth generator 30. The actual current IM in the motor circuit 12 is sensed by a current sensor 32 and a current signal 34 is supplied to a first input 36 of the phase control error circuit 38. A second input 40 of the error circuit 38 receives a current request signal IRW in accordance with the P signal, the sensed vehicle speed and the sensed vehicle weight. There is a proportional plus integral operation by the error circuit 38 to establish the difference error 42 between the actual motor current IM at input 36 and the requested motor current IRW at input 40. The comparator 44 operates to compare the error signal 42 with the sawtooth ramp signal 46 and where the error signal 42 intersects the ramp signal 46 establishes when the OFF pulse 48 is provided to fire ON the commutator thyristor 19 and turn OFF the main thyristor 14. The crystal oscillator 26 determines the turn-ON time of the main thyristor 14 in response to the effort request P signal on input 28 operative with the conduction apparatus 15 at the crystal time base such as 218 Hz. The turn-OFF time of the main thyristor 14 is determined by the error signal 42 in conjunction with a ramp signal 46.

Figure 2:
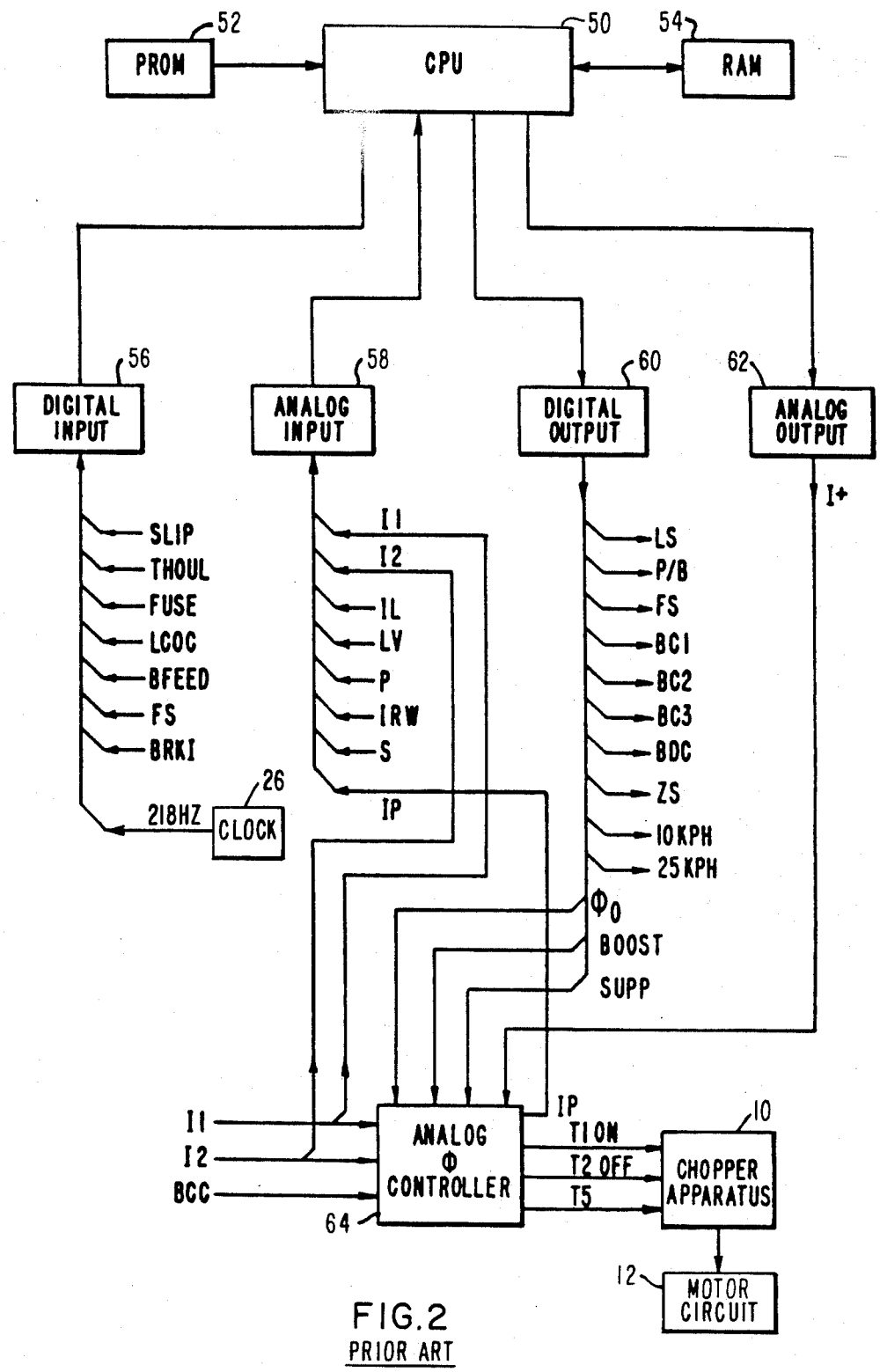
FIG. 2 shows the functional operation of a programmed microprocessor controlling a prior art motor control chopper apparatus.

In FIG. 2 there is shown a functional illustration of a prior art motor control apparatus including a CPU microprocessor 50 operative with a PROM programmable memory 52 and a scratch pad RAM random access memory 54 used for intermediate storage. The motor control application program, such as disclosed in above referenced U.S. Pat. No. 4,282,466, is stored in the programmable memory 52. There are four illustrated categories of input and output signals relative to the typical motor control operation of a transit vehicle as shown in FIG. 2. The digital input signals are supplied through digital input 56 and can include the signal from the chopper interrupt clock 26. The analog input signals are supplied through the analog input 58. The digital output signals are supplied through the digital output 60, and the analog output 62 provides the current request signal I+ to an analog phase controller 64 which is operative to supply the T1 control signal to turn ON the chopper apparatus 10 coupled with the motor circuit 12, the T2 control signal to turn OFF the chopper apparatus 10. A T5 control signal is shown to control the dynamic braking operation of the propulsion motor control chopper apparatus 10 if desired. The time period associated with turning the chopper ON is at a constant frequency of 218 Hz as determined by the clock 26.

The train control system operative with each vehicle, or a vehicle operator, provides an effort request P signal which selects a desired propulsion effort and this signal can go from 0 to 100 milliamps to establish how much propulsion power or braking effort is desired by a particular vehicle.

Figure 3:
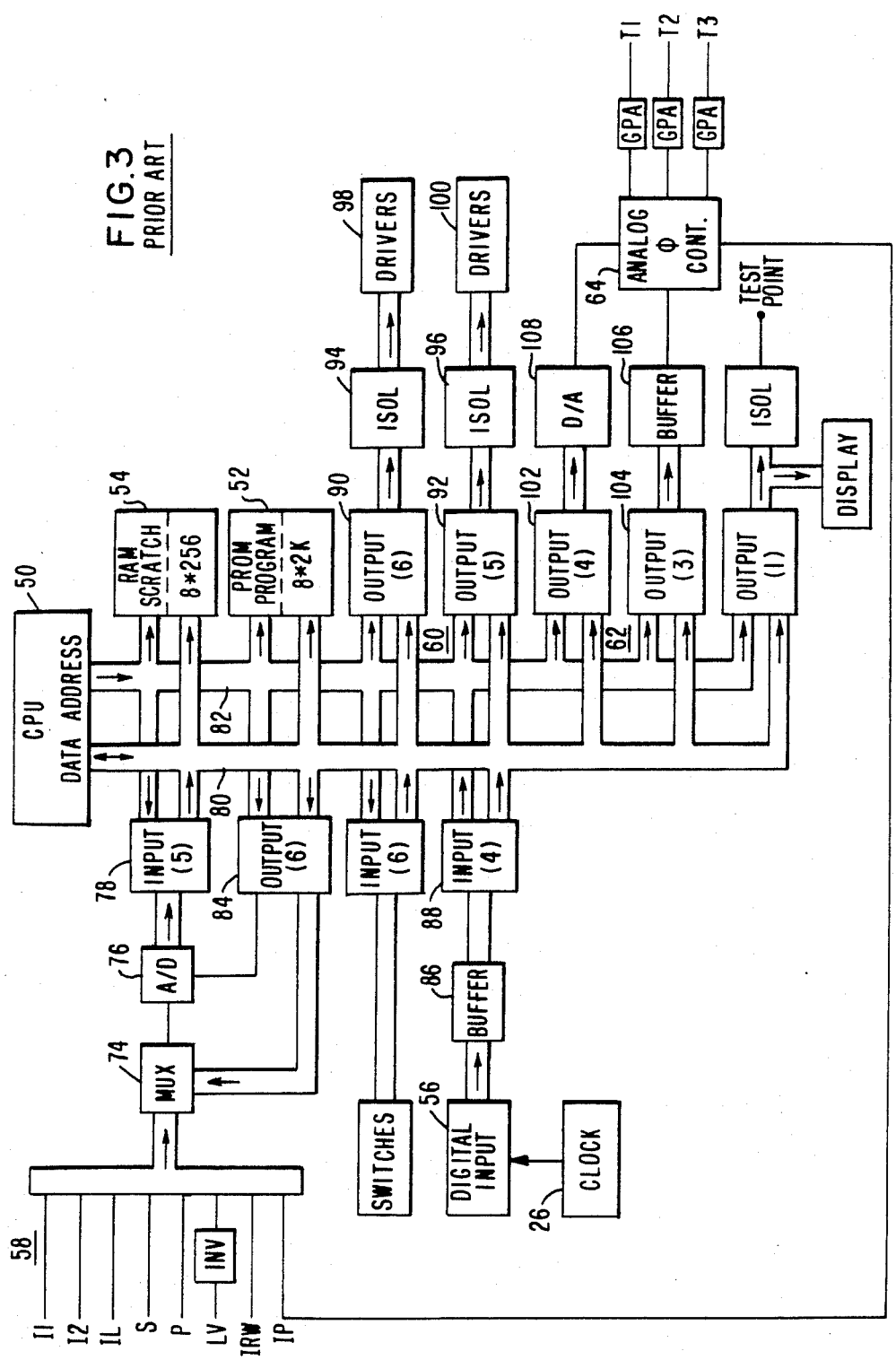
FIG. 3 shows the typical input signal operations and output signal operations of the apparatus shown in FIG. 2.

In FIG. 3 there is shown the typical prior art input signal operations and output signal operations of the motor control apparatus shown in FIG. 2, including the microprocessor 50 operative with the random access memory 54 and the programmable memory 52. The analog input signals are supplied through the analog input 58 through the multiplexer 74 and the analog-to-digital converter 76 and the input port 78 of the microprocessor 50 operative with a data bus 80 and an address bus 82. The address bus 82 and data bus 80 are operative through an output port 84 to control the multiplexer 74 and the analog-to-digital converter 76. The digital input signals are supplied through the digital input 56 operating through buffer 86 and the input port 88 operative with the data bus 80 and the address bus 128. The digital output signals are supplied through digital output 60 including output ports 90 and 92 and respective isolation circuits 94 and 96, with drivers 98 and 100. The analog output 62 is operative through output ports 102 and 104 through a buffer 106 and a digital-to-analog converter 108 operative with the analog phase controller 64.

The effort request P signal goes through the multiplexer 74 to request a particular vehicle operation. The control processor 50 senses the various currents, the various voltages and the vehicle speed, and it takes digital feedback signals through buffers to know what is going on in the power circuit in relation to currents and voltages. The control processor 50 provides output command signals to the power circuit, which command signals go on the data bus. The output ports function as latches so the control processor 50 can proceed to do other things while each latch remembers what is on the data bus at a given address. The control processor 50 outputs a signal to close the necessary power switches as desired and also outputs a requested motor current, which requested motor current is decoded in a digital-to-analog converter. The analog motor control circuit in response to this current request senses the actual motor current and the commutating capacitor voltage and if everything is satisfactory, the motor control circuit appropriately fires ON the drivers for the chopper apparatus.

Figure 4:
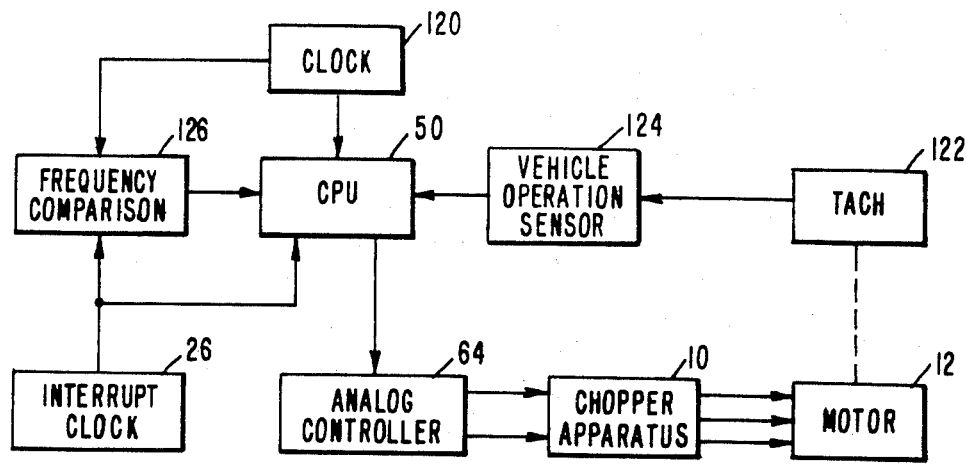
FIG. 4 functionally shows the chopper frequency control apparatus of the present invention.

FIG. 4 functionally shows the chopper frequency integrity determination apparatus of the present invention. The chopper frequency interrupt clock 26 supplies a signal to the CPU 50 to initiate the T1 signal from the analog controller 64 to turn ON the chopper apparatus 10. In addition, the CPU 50 has an internal clock 120 which controls the operation of the CPU 50. When the CPU 50 receives the interrupt signal from the interrupt clock 26 it begins to execute all of the main propulsion control programs and a selected first portion of the priority interrupt programs, which priority interrupt programs are selected to be always the same and, therefore, take the same time to execute. When the CPU receives a determined vehicle operation signal, such as a zero vehicle speed signal from the tachometer 122 and vehicle operation sensor 124 indicating that the motor 12 has reached a defined operation condition for a predetermined time interval, the CPU 50 begins to check the frequency of the interrupt clock 26 and upon the next interrupt signal from the clock 26 and the completion of the first portion of the priority interrupt programs, begins incrementing a register which counts the pulses from the clock 120. When the second interrupt signal from the clock 26 occurs, the register stops incrementing and the CPU 50 then looks to see what count value is stored in the register. If the register count value is outside of a predetermined count range, a flag is set which will cause a shut down procedure to be executed and terminate the operation of the motor control chopper apparatus 10. If the register count value is within this predetermined count range, the flag is not set and the motor control chopper apparatus 10 operation continues in accordance with the provided propulsion control application program. In this way for each occurrence of the determined vehicle operation signal, such as indicating a zero speed condition, the chopper frequency of the interrupt clock 26 can be checked to within a predetermined number of clock counts from the clock 120. The chopper frequency interrupt clock 26 determines the firing ON of the chopper apparatus 10 by the T1 pulse. The T1 pulse is fired by the interrupt clock 26 and the current request IRW determines the subsequent timing of the T2 pulse to turn OFF the chopper apparatus 10. The normal operation is the interrupt clock 26 supplies a control pulse to the CPU 50 which controls the firing ON by the analog controller 64 of the chopper apparatus. To check the frequency of the interrupt clock 26, the signals from the internal clock 120 of the CPU 50 running at a higher frequency, such as 5 MHz, are counted between successive signals from the interrupt clock 26 running at a lower frequency, such as 218 Hz, and the frequency comparator 126 checks to determine how many pulses from the faster internal clock 120 occur between successive interrupt pulses from the slower interrupt clock 26, and this check is made once when the predetermined vehicle operation signal is provided to indicate the occurrence of some vehicle condition, such as a decrease of the speed to a predetermined zero speed condition. Each time this vehicle operation occurs the interrupt clock frequency is checked. The frequency comparison 126 determines whether the interrupt clock frequency has shifted by more than a predetermined number of counts of the input clock 120, either increasing counts or decreasing counts. The chopper apparatus 10 is stopped if this check determines for the time period between the successive pulses from the interrupt clock that the count pulse value in the register is outside the allowed range of counts from the internal clock 120.

Until the predetermined vehicle operation is sensed, the chopper frequency register remains initialized to the correct number of counts that should be provided by the CPU clock 120 between successive interrupts from the chopper interrupt clock 26, so the comparison made at step 152 will continue to be satisfied for each interrupt input signal that occurs, and the program operation will return to the main program at step 141. The chopper frequency register count is initialized and fixed until after the predetermined vehicle operation condition is sensed, and after that condition is sensed, the initialized correct number in this register is cleared and the actual number of pulses from the CPU clock 120 is then counted between successive interrupt signals from the clock 26 to determine if the operating freuency of the clock 26 is the same within a permitted tolerance, as the desired frequency that was provided in the program for comparison with the register count at step 152.

The execution time required for the first portion of the priority programs at step 145 is always the same and known, so the total correct time between successive interrupts from the clock 26 minus this first portion priority program execution time determines the count time period that the chopper frequency register should be counting the output pulses from the CPU clock 120. The correct count number provided in the program for comparison with the register count at step 152 is provided in accordance with the number of output pulses from the CPU clock 120 that are provided during this count time period.

Figure 5:
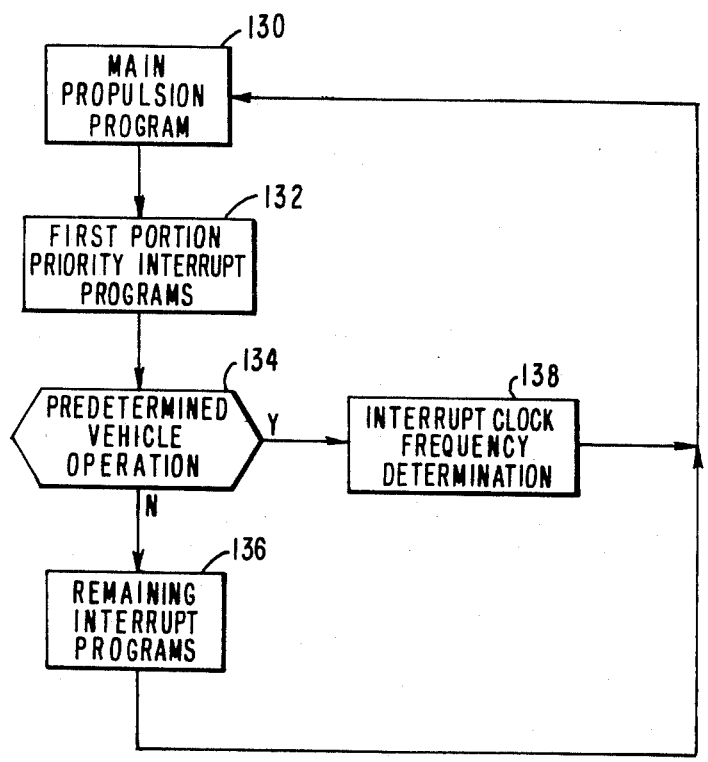
FIG. 5 illustrates the programmed operation of the microprocessor control apparatus of the present invention.

FIG. 5 ilustrates the programmed operation of the microprocessor 50 in accordance with the present invention and includes execution of the main propulsion motor control program 130, followed by execution of the first portion of the priority interrupt programs 132. A check is made at step 134 to establish if the predetermined vehicle operation, such as a zero speed condition occurred, and if the vehicle did not experience this operation, the remainder of the interrupt programs is executed at step 136. If the vehicle operation did occur, the check of the interrupt clock frequency status determination is made at step 138 and the operation returns to the main propulsion control program 130.

Figure 6A:
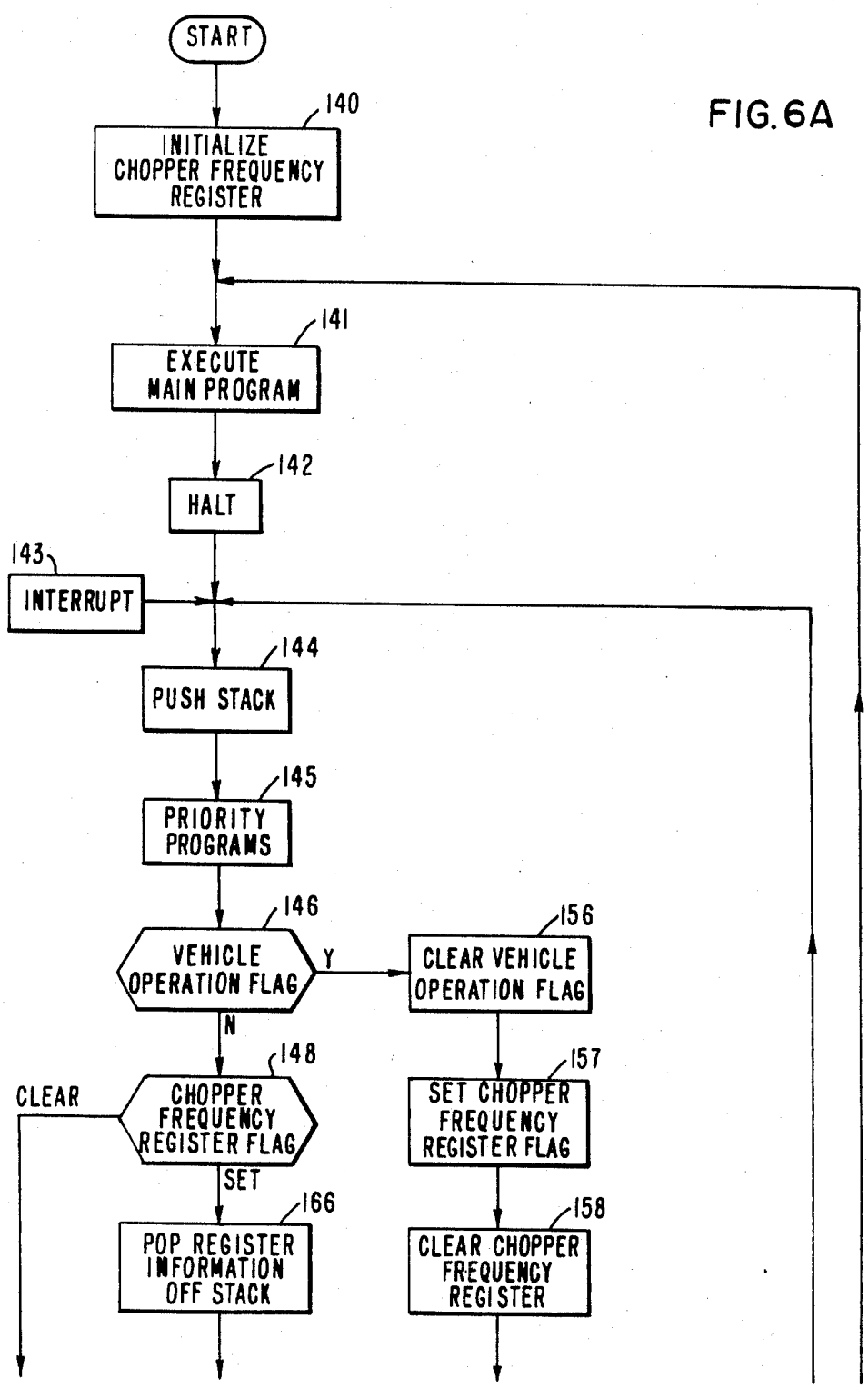
FIGS. 6A and 6B show a flow chart to illustrate the frequency determination operation of the present invention.
Figure 6B:
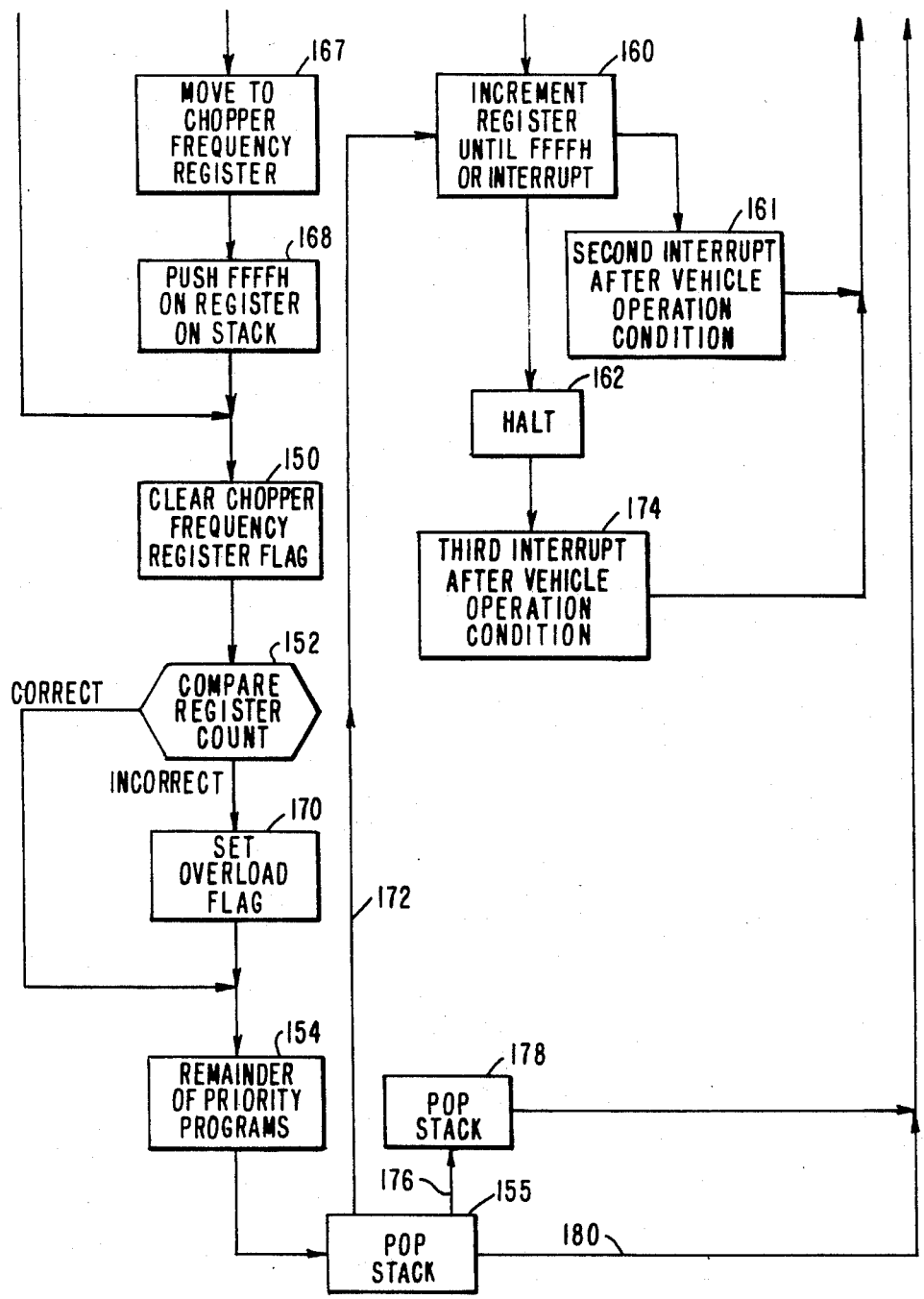

In the flow chart of the frequency comparison operation in accordance with the present invention as shown in FIG. 6, a chopper frequency register in RAM is initialized at step 140 to the desired number of pulses from the internal clock 120 which are provided between successive interrupt pulses from the clock 26. At step 141 the CPU 50 executes the main motor control program and then halts at step 142. The next interrupt from the clock 26, and assume this is interrupt A, is sensed at step 143, and at step 144 a push stack operation is provided where the contents of temporary registers within the CPU 50 are pushed onto a memory stack in RAM 54 to enable the CPU 50 to execute the interrupt programs without losing this information. At step 145 the first portion of the priority interrupt programs are executed, and these are selected not to change so the execution time is known. At step 146 a decision is made to determine if the vehicle has experienced a predetermined vehicle operation, such as a zero speed condition, such to initiate a check of the chopper frequency. This check is made once when the predetermined vehicle operation occurs, such as the vehicle arriving this zero speed condition. For the purpose of example, assume the vehicle did not just arrive at this zero speed condition so the vehicle operation flag is clear, then at step 148 a decision is made whether the actual count reading in the temporary chopper frequency register should be saved. Since an actual reading has not been taken of internal clock pulse counts in response to a vehicle operation condition, which for a zero speed condition is established to be that the pulses from the vehicle tachometer go below a determined number of pulses per second for a predetermined time period, then the decision at step 148 is that the flag is clear. And at step 150 the flag to save the temporary chopper frequency register reading is cleared. At step 152 a decision is made by comparing the actual count with a desired count to see if the chopper frequency pulse count in the register in RAM is correct. An actual reading of pulse counts was not made of the pulse frequency from the clock 120 between successive interrupt pulses from clock 26, but the chopper frequency register in RAM was initialized at step 140 with the desired count reading as provided in the program so this comparison with the desired count is correct. At step 154 the remainder of the priority programs is executed. At step 155 the memory stack is popped from RAM back into the CPU, and the operation of CPU 50 returns to execute the main program step 141 and then halts at step 142.

The program shown in FIG. 6 is written for operation with an Intel 8086 microprocessor for the CPU 50 shown in FIG. 4, which microprocessor functions to push information onto a register stack during an interrupt and then pop that information off the stack at the completion of the interrupt.

For purpose of explanation, assume the previous interrupt A was before the vehicle experienced predetermined operation, such as a zero speed condition, and then a zero speed condition occurred between that interrupt A and the following interrupt B. A zero speed condition is established when the output pulses from the tachometer go below a determined number of pulses per second, such as 180 pulses per second corresponding to about one mile per hour or less travel of the vehicle, and this speed condition prevails for a predetermined time period of one or two seconds, as sensed by the zero speed sensor 124 shown in FIG. 4 to set a zero speed flag signal.

In response to the first interrupt B subsequent to the sensed operation, at step 143 from the clock 26 at 218 hertz or whatever is the chopper frequency, the CPU will push the stack at step 144 and execute the first portion of the priority programs that ran the chopper at step 145. At step 146 a check is made to see if the vehicle operation flag is set, and it now is set since a zero speed condition of the vehicle was sensed before the interrupt B. The program operation goes to step 156, where the vehicle operation flag is cleared. At step 157 the save chopper frequency register flag is set, since new count information will be received. At step 158 the temporary chopper frequency register in the CPU is cleared to get ready for this new information. At step 160 this temporary register is incremented by the output pulses from the CPU clock 120 until the next second interrupt C subsequent to the sensed vehicle operation from the chopper interrupt clock 26; which interrupt C is the second interrupt after sensing the predetermined vehicle operation. This second interrupt C at step 161 sends the operation back to push the stack at step 144.

If the interrupt clock 26 should fail or malfunction for some reason such that another interrupt was slow or not provided, the register at step 160 would count up to the maximum count of FFFFH and the operation would then go to the halt step 162.

In response to the second interrupt C at step 161 after the sensed vehicle operation condition, the program would go to the step 144 and push the information in the CPU registers on the stack in RAM storage. The first portion of the priority programs are executed at step 145. At step 146 a check is made to see if the vehicle operation flag is set, and at this time it is not since it was cleared the last time through the program at step 156.

At step 148 a check is made to see if the chopper frequency register flag is set, which it now is since there is new information in the register. At step 166 this chopper frequency register information is popped off the stack in RAM and brought back into the CPU. At step 167 this count information is moved to the chopper frequency register in RAM. At step 168 the maximum count is pushced onto the stack register in RAM. At step 150 the chopper frequency register flag is cleared, since the new information is already in the RAM register.

At step 152 a comparison check is made to see if the register actual count of the pulses from the CPU clock 120 is correct in relation to the desired count number provided in the program for this purpose.

If the actual count number is the same as the desired count number provided in the program for comparison, the operation goes to step 154 to execute the remainder of the priority programs as before. However, if the actual count number is not correct, by being outside of a predetermined desired tolerance such as 1 or 2 counts or 1% of the desired count of the pulses from the CPU clock 120 between successive interrupt pulses from the interrupt clock 26, then at step 170 an overload flag is set. The overload flags are checked during each program cycle of the CPU, and such an overload condition will stop the operation of the CPU 50. Typical other overload conditions can be the motor voltage is too high, the line current is too high. A well known overload routine that checks for overload flags would operate to shut down the operation of the CPU 50 in response to the setting of an overload flag.

After setting the overload flag at step 170, the operation goes to step 154 to execute the remainder of the priority programs. At step 155 the stack is popped, and the CPU 50 knows that the present operation was in response to second interrupt C, so the operation path 172 is now taken to step 160 and since at step 168 the maximum FFFFH was previously pushed on this register the operation now goes to step 162 for a halt and waits for the third interrupt D subsequent to the sensed vehicle operation. When the third interrupt D occurs at step 174, the operation goes back to push the stack at step 144. The response to the third interrupt D is provided to be certain that each push on the stack is matched with a corresponding pop of the stack. The program proceeds as previously explained, at step 146 the vehicle operation flag is not set, at step 148 the chopper frequency register flag is not set, at step 152 if the actual count was correct before it is still correct, and at step 155 the stack is popped. The CPU 50 knows to follow path 176 after the third interrupt D and at step 178 the stack is popped again since in relation to first interrupt B that operated with steps 156, 157, 158, and 160 and 161, the pop stack step 155 was not included so the additional pop of the stack provided at 178 matches the push of the stack at step 144 for the first interrupt B.

The CPU knows to take the operation path 180 after interrupt A which was before the vehicle operation was sensed, to take the operation path 172 after first subsequent interrupt B which was the first interrupt after the vehicle operation was sensed, and to take operation path 176 after second subsequent interrupt C which was the second interrupt after the vehicle operation was sensed.

If the actual count number was correct at step 152 in relation to the provided desired count number in the program, then the third interrupt D after the vehicle operation was sensed will follow the normal operation path 180.

The increment register operation at step 160 is in relation to an intermediate register within the CPU 50. At step 144 the contents of the intermediate registers within CPU 50 are pushed on a memory stack in RAM. At steps 166 and 155, the information in the RAM stack is popped back into the CPU 50. At step 167 the information in the CPU 50 is moved to the chopper frequency register in RAM.

If the CPU 50 is an Intel 8088 it can operate at 5 megahertz or at 8 megahertz. If the CPU 50 is a different microprocessor it might operate with a different clock frequency. So the desired resolution and error tolerance that is established for the frequency comparison at step 152 will be related to the frequency of clock 120 operative with the CPU 50, and the desired count reference provided in the program for comparison with the actual count in the chopper frequency register will be selected accordingly.

GENERAL DESCRIPTION OF INSTRUCTION PROGRAM LISTING

In the appendix there is included an instruction program listing that has been prepared to control a vehicle propulsion motor control operation in accordance with the here disclosed control program shown in FIG. 6. This instruction program listing is written in the assembly language of the Intel 8086 microprocessor, which operates in accordance with the 8086 Family User's Manual published in October 1979 by the Intel Corporation, Santa Clara, Calif., 95051, and is included to provide an illustration of one suitable embodiment of the present frequency determination apparatus that has actually been prepared. This instruction program listing at the present time is a more or less development program and has not been extensively debugged through the use of practical operation in a transit system. It is well known by persons skilled in this art that real time process control application programs may contain some bugs or minor errors and it is within the skill of such persons and takes varying periods of actual time to identify and routinely correct the more critical of these bugs.

APPENDIX A

```
INT::   PUSH    CX
        PUSH    DX
        PUSH    BX
        LAHF
        PUSH    AX
        MOVBI   205AH,0F0H      ;OUT MODE
        CMPBI   ?ZSC##,0F0H     ;TIME TO DO FREQ CHECK ?
        JZ      FRQCH           ;YES
        .
        .
        .
```

APPENDIX A-continued

```
            MOVB     AL,?FREQF##        ;CHECK CHOPPER FREQ REGISTER FLAG
            ANDBI    AL,0FFH            ;SAVE FREQ DATA ?
            JZ       NCHG3              ;NO
            POP      AX
            SAHF
            POP      BX
            POP      DX
            POP      CX
            MOV      ?FREQ##,CX         ;GET INFO
            MOVI     CX,0FFFFH          ;END COUNTING
            PUSH     CX
            PUSH     DX
            PUSH     BX
            LAHF
            PUSH     AX
            MOVBI    AL,00H
            MOVB     ?FREQF##,AL        ;CLEAR CHOPPER FREQ REGISTER FLAG
            .
            .
            ;CHECK CHOPPER FREQ INTEGRITY
OVLCH9:     CMPI     ?FREQ##,02B6H      ;CORRECT FREQ ?
            JZ       CLROVL             ;YES
            CMPI     ?FREQ##,02B7H      ;CORRECT FREQ ?
            JZ       CLROVL             ;YES
            ORBI     ?CHFG1##,80H       ;SET BIT 7 OVERLOAD FLAG
            .
            .
            REMAINDER OF
            PRIORITY
            PROGRAMS
            .
            .
IRET1:      MOVBI    205AH,0F0H
            POP      AX
            SAHF
            POP      BX
            POP      DX
            POP      CX
            STI
            IRET
            .
            .
            ;DETERMINE FREQ OF CHOPPER
FRQCH:      ADDBI    ?ZSC##,01H
            MOVBI    ?FREQF##,0FFH      ;SET CHOPPER FREQ REGISTER FLAG
            MOVBI    CL,00H
            MOVBI    CH,00H
            STI
FREQ1:      ADDBI    CL,01H
            JNB      FREQ1
            ADDBI    CH,01H
            JNB      FREQ1
            HLT
            POP      AX
            SAHF
            POP      BX
            POP      DX
            POP      CX
            IRET
```

I claim:

1. In combination a control apparatus for a motor, a chopper responsive to first signals from a chopper interrupt clock having a first frequency, said motor being operative with a programmed microprocessor, said microprocessor being operative with second signals from the microprocessors internal clock having a second frequency, means for sensing a predetermined operation of said motor and supplying a control signal when said operation of said motor is sensed, means responsive to said control signal for determining the frequency of the chopper interrupt clock by comparing said chopper interrupt first frequency signals with said microprocessor internal clock second frequency signals to determine the number of second frequency signals that are provided between successive first frequency signals to establish when there has been a predetermined frequency change in said first frequency signals, and means coupled with the motor and responsive to said predetermined frequency change in said first frequency signals for terminating the operation of said motor.

2. The motor control apparatus of claim 1, with said predetermined operation being a zero speed condition of the motor where the motor speed is below a determined zero speed for greater than a determined time period.

3. The motor control apparatus of claim 1, including
a tachometer coupled with the motor for providing output pulses in relation to the motor speed, and
with the predetermined operation being the provision of said output pulses at less than a determined pulse rate for greater than a determined time period.

4. The motor control apparatus of claim 1,
with said predetermined change in the first frequency being a change greater than an established difference number of second signals above or below a desired number of the second signals.

5. An apparatus for determining the frequency of a chopper connected to establish the operation of a motor, said chopper being controlled by a microprocessor including an internal clock providing clock signals having a first frequency,
first means for sensing an operating condition of the motor for providing a control signal when said condition occurs,
second means providing interrupt signals having a second frequency slower than said first frequency and coupled with the chopper for controlling the frequency of the chopper,
third means initiated by said control signal for responding to each of the clock signals and to the interrupt signals for counting the number of clock signals provided between successive interrupt signals to determine when a predetermined change has occurred in said second frequency, and
fourth means coupled with the third means for terminating the operation of the motor when said predetermined change in the second frequency has occurred.

6. The frequency determining apparatus of claim 5,
with the operating condition being a speed condition of the motor that occurs when the motor operates at a predetermined speed from a predetermined time period.

7. The frequency determining apparatus of claim 5,
with the microprocessor including a program having a reference count and including a register for providing an actual count of the first frequency clock signals that are provided between successive second frequency interrupt signals, and
with said third means comparing said actual count with said reference count to determine when said predetermined change in said second frequency has occurred.

8. The frequency determining apparatus of claim 5,
with the first frequency being in the order of several million hertz and with the second frequency being in the order of several hundred hertz.

* * * * *